United States Patent [19]
Aiello

[11] 3,827,773
[45] Aug. 6, 1974

[54] LOCKER CONSTRUCTION INCORPORATING LOCKING MEANS FOR CYCLES

[76] Inventor: Anthony C. Aiello, 481 Raymond Ave., San Jose, Calif. 95128

[22] Filed: Mar. 6, 1972

[21] Appl. No.: 231,895

[52] U.S. Cl............ 312/100, 70/234, 211/5, 312/254, 312/280, 70/81, 292/DIG. 3
[51] Int. Cl............ A47b 81/00, E05b 73/00
[58] Field of Search.......... 211/5, 4, 22, 17; 70/235, 70/234, 233; 312/280, 100, 254, 215, 237; 248/203

[56] References Cited
UNITED STATES PATENTS

| | | | |
|---|---|---|---|
| 577,993 | 3/1897 | Thurston | 70/234 X |
| 614,432 | 11/1898 | Austin | 211/5 |
| 617,693 | 1/1899 | Shultz | 70/235 X |
| 640,433 | 1/1900 | White | 211/20 X |
| 2,202,427 | 5/1940 | Polen | 312/280 X |
| 2,987,359 | 6/1961 | Kennon | 312/254 X |
| 3,675,085 | 7/1972 | Stanback | 312/100 X |

FOREIGN PATENTS OR APPLICATIONS
1,006,071  1/1952  France ................................. 70/233

Primary Examiner—Ramon S. Britts
Attorney, Agent, or Firm—John J. Leavitt

[57] ABSTRACT

Presented is a locker construction which incorporates a locking mechanism, including a chain or cable, for locking a bicycle or motorcycle to the locker for security purposes. The lock construction for the locker incorporates means for locking one end of the chain or cable to the locker.

5 Claims, 16 Drawing Figures

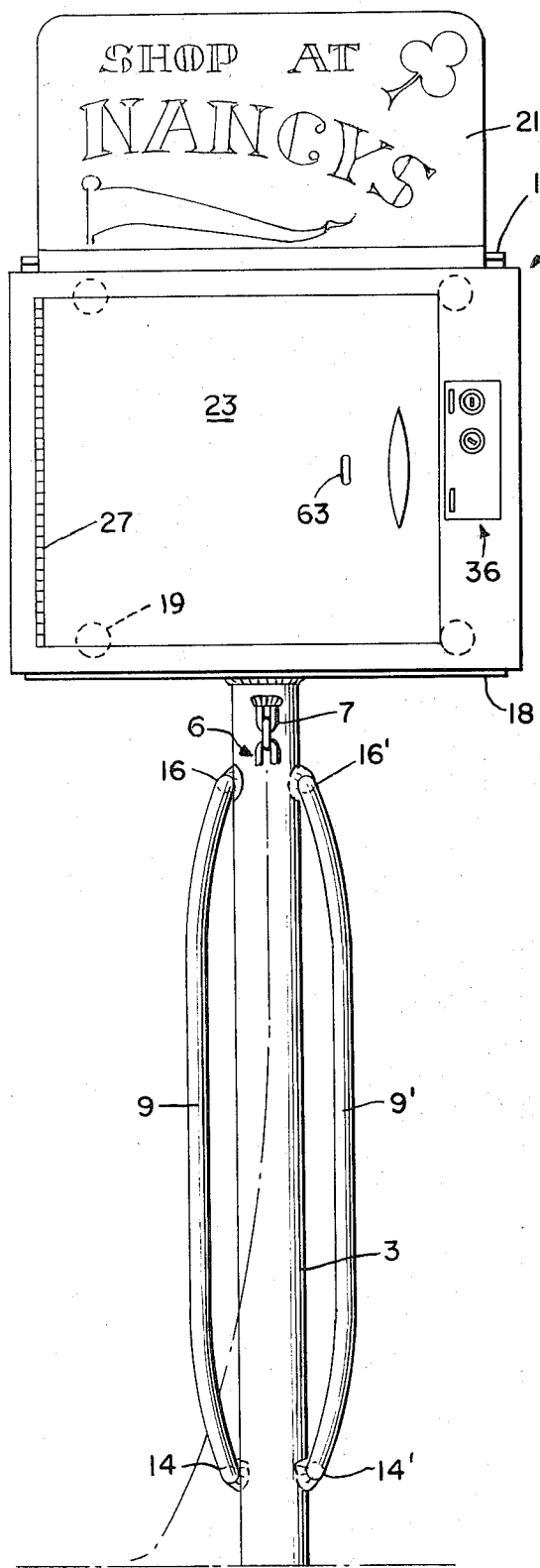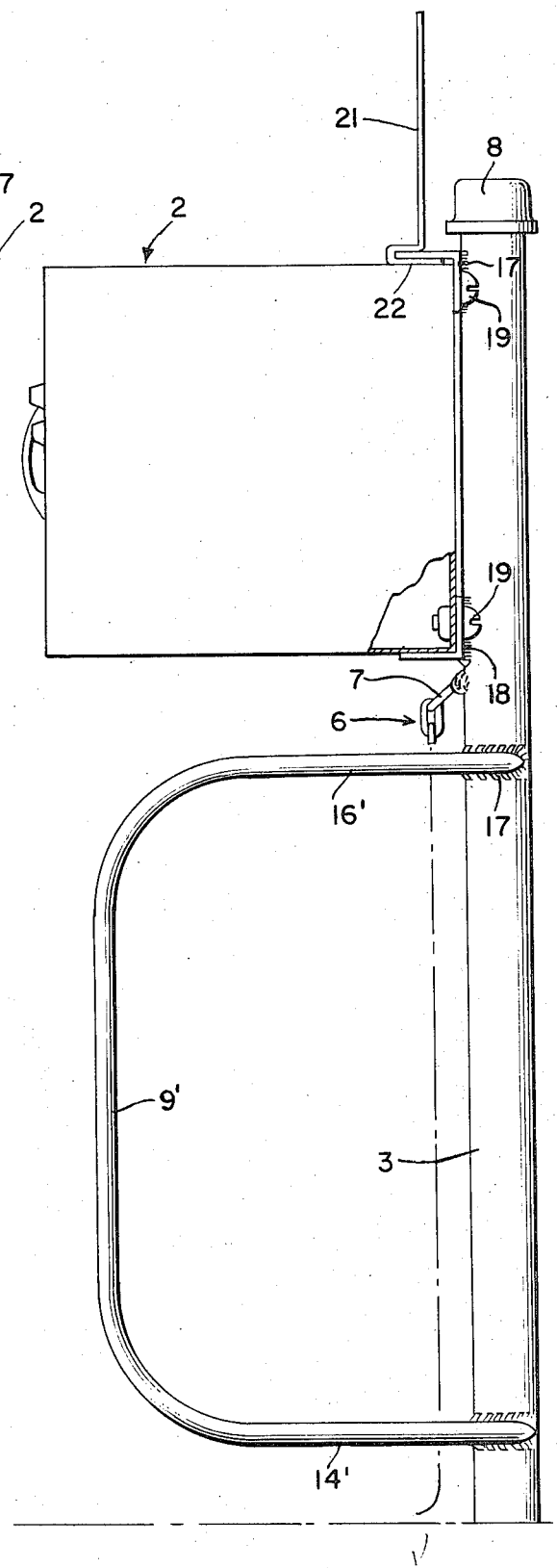

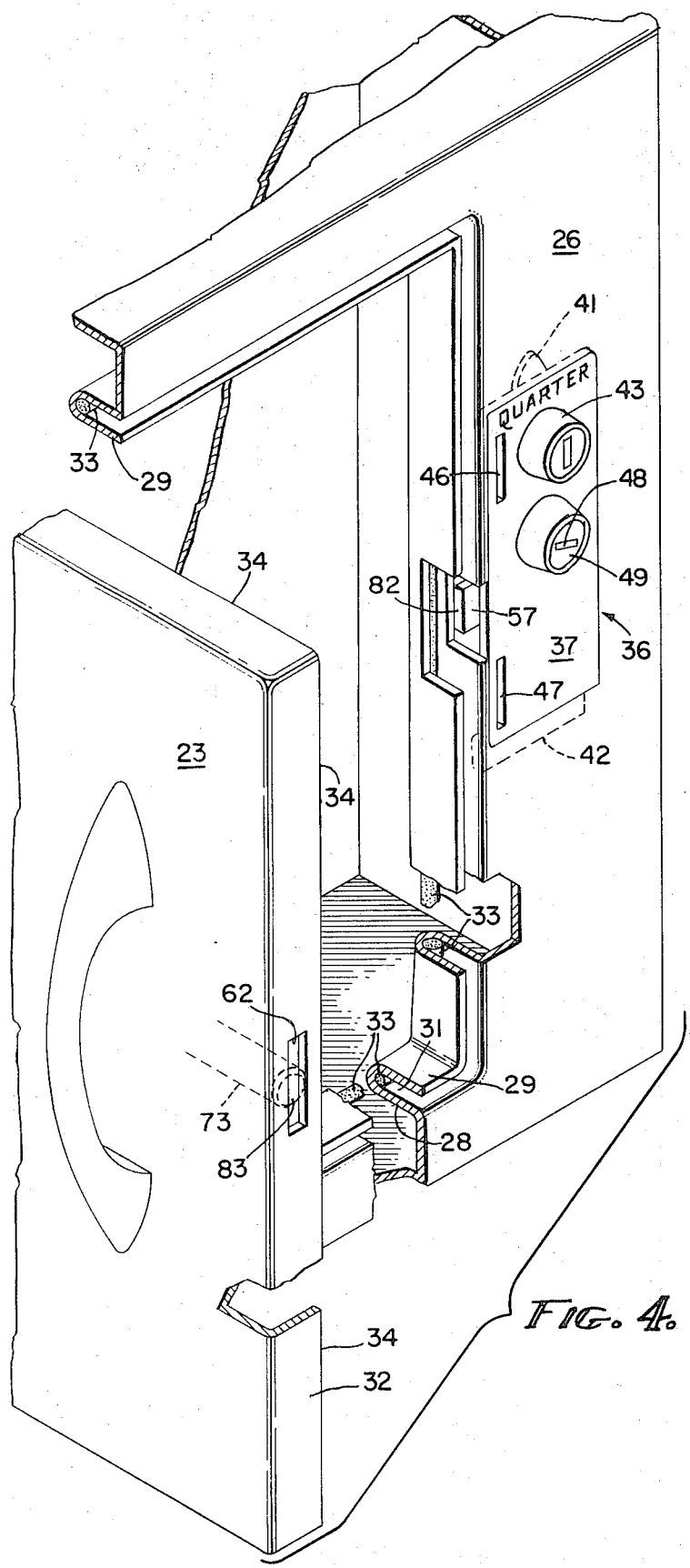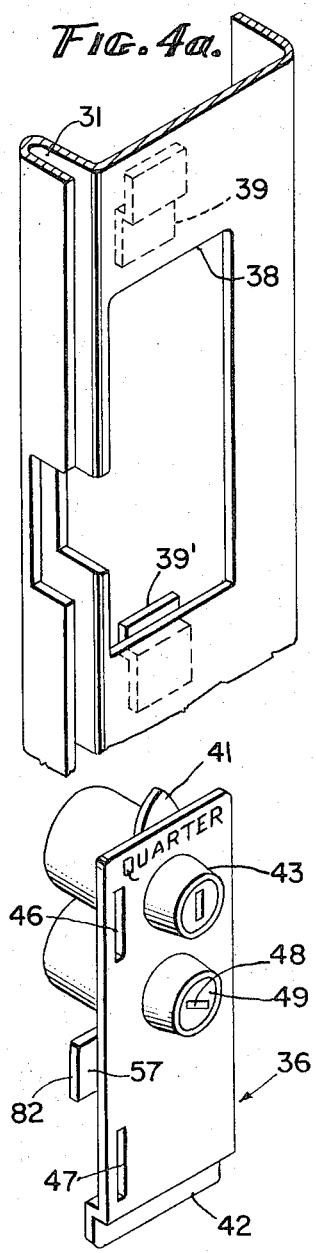

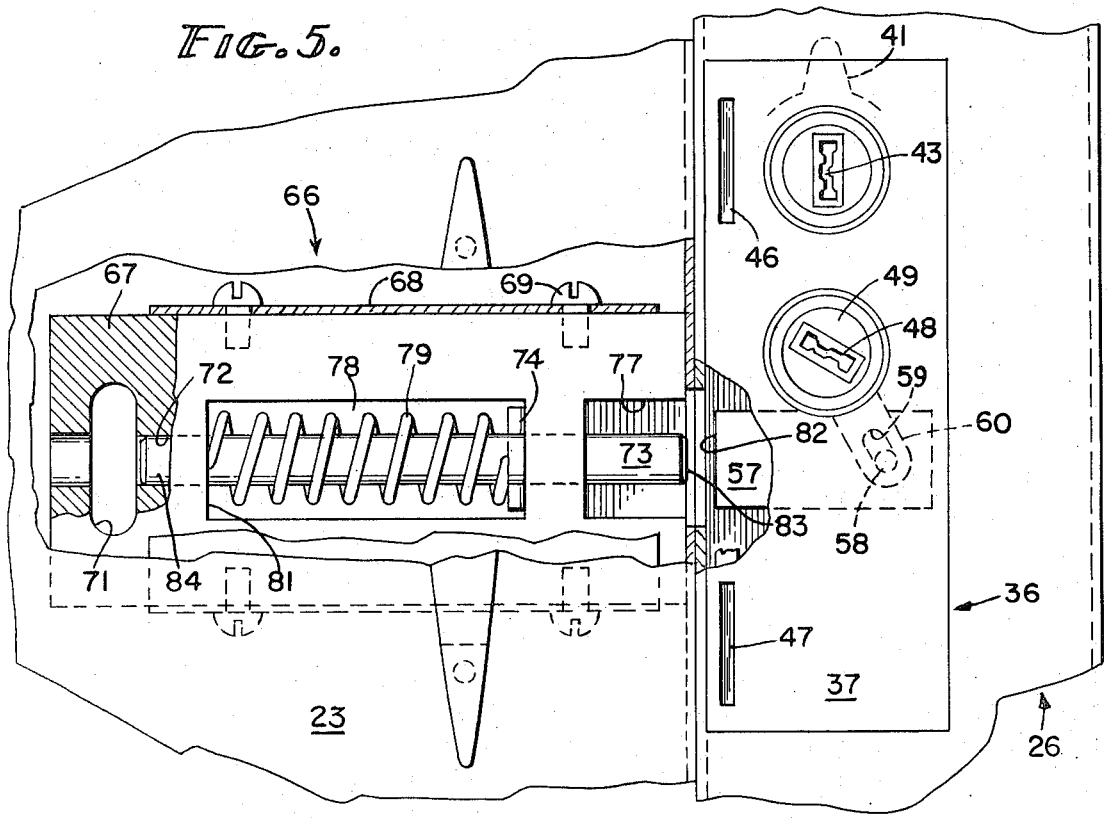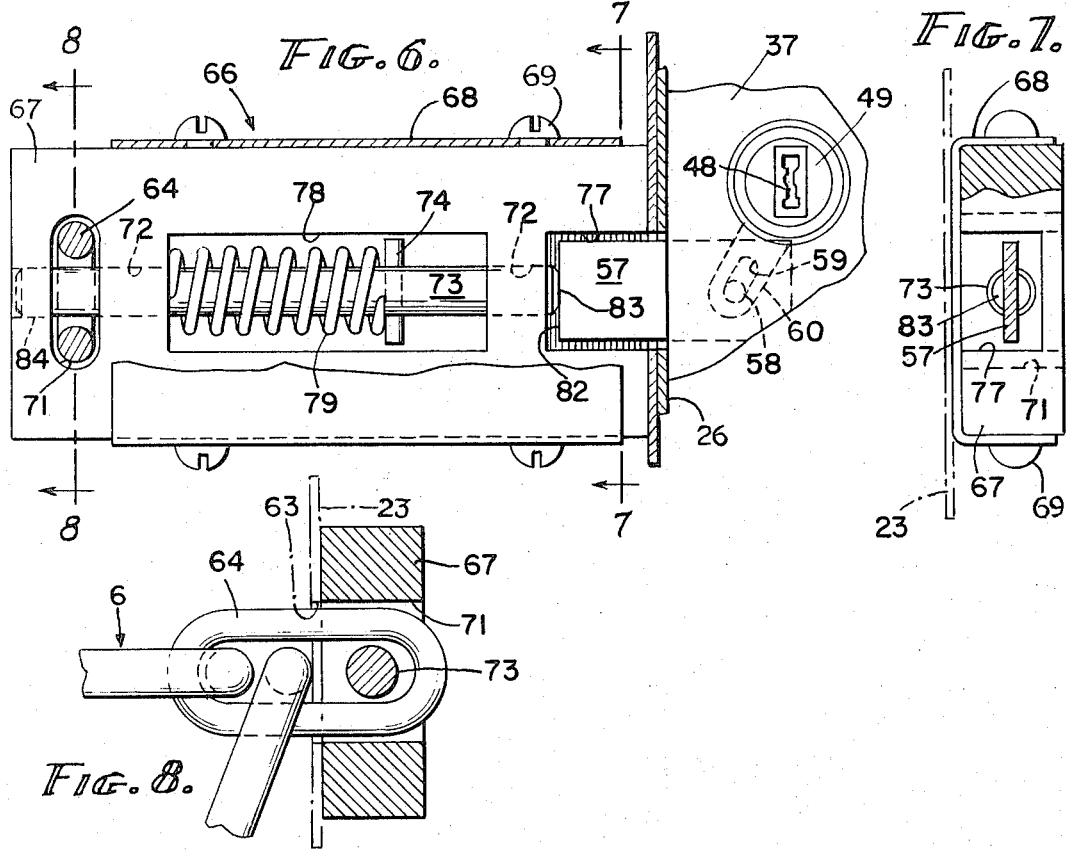

LOCKER CONSTRUCTION INCORPORATING LOCKING MEANS FOR CYCLES

BACKGROUND OF THE INVENTION

The increased popularity of bicycles and motorcycles has created a security problem for the owners of such vehicles. Another problem not quite so obvious is the problem raised by the increased frequency with which riders of bicycles and motorcylces carry personal property of value such as groceries or books or other items, and require storage facilities for such articles when the cycle is parked. Accordingly, it is one of the objects of the invention to provide a locker construction incorporating a chain or cable locking means which operates in conjunction with the lock mechanism of the locker to prevent theft of the cycle.

Another problem encountered by persons that need use of a locker, is the problem of having the correct change to activate the locking mechanism of the locker, and the correlated problem of cost with respect to locker use. It is accordingly one of the objects of the invention to provide a locker construction in which the lock mechanism is adapted to refund to the user of the locker the coin originally inserted.

It is of course well known that locker constructions of various types have been used for many years. Primarily, such conventional lockers are located in bus and railroad depots, and airline terminals and in general are maintained within a weather tight building.

However, lockers such as those described herein incorporating locking means for cycles will normally be mounted outdoors where they are subject to inclement weather. Accordingly, it is a still further object of the invention to provide a locker construction which is waterproof so that articles placed for safe keeping in the locker will not be subjected to inclement weather.

Because the locker construction of the invention, incorporating as it does locking means for cycles, will normally be mounted out-doors, there is a possibility that vandals will attempt to carry the locker construction away. Accordingly, it is another object of the invention to provide a locker construction incorporating locking means for cycles which is securely anchored to an associated building or to an appropriate footing buried in the ground so as to discourage removal of the locker.

It is to be expected that vandals will in some way attempt to destroy either the locker and the cycle locking means, or will attempt to open the locker to remove the contents thereof. Accordingly, a still further object of the invention is to provide a locker construction which incorporates appropriate alarm means to signify that an unauthorized person is tampering with the locker or a cycle locked thereto.

Another object of the invention is to provide a cycle stand incorporating locking means for locking the cycle to the stand.

The invention possesses other objects and features of value, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the locker construction incorporating security means for cycles comprises a vertically extending post, pedestal or wall having attached thereto a pair of bifurcated arms within which one wheel of the cycle may be nested to support the cycle in an upright attitude. In one aspect of the invention, a post forms such support, and there is mounted on the top end of the post a hollow compartment or receptacle having a door lock mechanism that is conditioned by insertion of a coin to permit manipulation of a key so as to simultaneously lock the compartment door and lock the security means for the cycle to the receptacle or post on which it is mounted. After the door and cycle security means are locked to the receptacle, the key is withdrawn and the coin with which the lock mechanism is conditioned is left behind. When the user of the locked receptacle and owner of the cycle returns to recover his property from the receptacle and release his cycle, he merely inserts the key in the lock mechanism and turns it to unlock the door, thus releasing the coin and simultaneously unlocking the cycle securing means. In another aspect of the invention, a post or pedestal is provided securely anchored in the ground to prevent it being carried away, and a similar lock mechanism embodying an appropriate deposit slot for a coin and a key is utilized to lock or secure the bicycle or motorcycle directly to the post or pedestal in the absence of a receptacle. Means may also be incorporated in the receptacle or post constituting an audible alarm which will be activated if anyone succeeds in cutting or breaking the chain or cable with which the cycle is secured, or is successful in breaching the security compartment.

BRIEF DESCRIPTION OF THE DRAWINGS

FIG. 2 is a front elevational view of the assembly.

FIG. 3 is a side elevational view of the assembly.

FIG. 4 is a fragmentary composite view in exploded perspective illustrating a portion of the front face of the locker, the door and the lock mechanism associated therewith, and illustrating also the means for making the locker weather tight.

FIG. 4 a is a fragmentary perspective of the opening in the front wall of the locker into which the lock plate is detachably secured.

FIG. 4 b is a perspective view of the lock plate.

FIG. 5 is a fragmentary view illustrating the lock plate structure for locking the locker door, and auxiliary lock mechanism for locking the cycle to the locker. Portions of the structure are broken away to reveal underlying parts.

FIG. 6 is a fragmentary view illustrating the auxiliary lock mechanism illustrated in FIG. 5, but in locked position.

FIG. 7 is a vertical cross-sectional view taken in the plane indicated by the line 7—7 in FIG. 6, portions being shown in elevation for clarity.

FIG. 8 is a vertical cross-sectional view taken in the plane indicated by line 8—8 in FIG. 6, portions being shown in elevation for clarity.

DESCRIPTION OF THE PREFERRED EMBODIMENT

Figure 1:
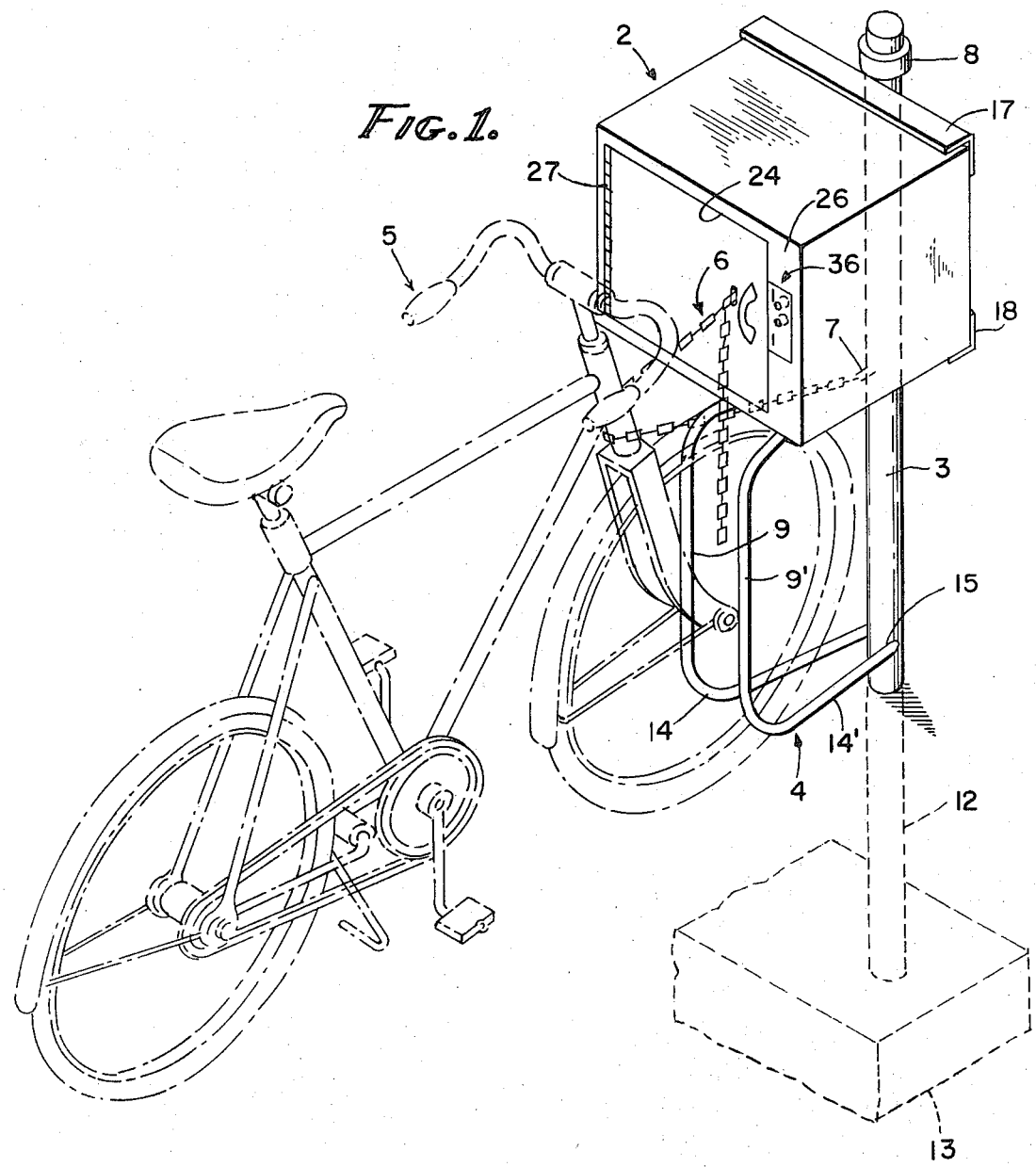
FIG. 1 is a perspective view of the assembly, the chain illustrated in a position of use.

In terms of greater detail, the locker construction and lock means for cycles is illustrated in an attitude of use in FIG. 1. As there shown, the invention includes a receptacle or locker designated generally by the numeral 2, mounted on an appropriate pedestal or post 3, and provided with a pair of forwardly projecting wheel-confining means designated generally by the numeral 4. To secure a cycle to the assembly a chain 6 is provided, one end 7 of which is securely welded either to the post 3 as shown, or to the receptacle 2. Preferably, the chain is welded to the post which in a convenient installation may comprise a two, three or four inch diameter iron pipe having an appropriate cap 8 at its upper end. As illustrated in FIG. 1, a cycle, whether it be a bicycle or motorcycle, may be secured to the post and locker by inserting the front wheel of the cycle between the spaced generally parallel bars 9 and 9' forming the cycle support means. The chain is then draped through or engaged in any convenient manner with a structural part of the cycle and one of the links of the chain is appropriately locked to the locker or post in a manner which will be hereinafter explained in greater detail.

As illustrated in FIGS. 1, 2 and 3, the pedestal or post 3 is provided with a lower end portion 12 embedded in the ground and anchored by an appropriate concrete block 13. Such construction will prevent the post and attached locker from being carried away by vandals. Additionally, the post is of sufficient diameter to discourage people from striking the post with a vehicle except in an accidental manner.

The cycle retention means 4 conveniently comprises the parallel bars 9 and 9' extending vertically parallel to the post and generally in planar alignment with the front face of the locker 2. These bars are integral with rearwardly extending mounting portions 14 and 14' the extreme ends 15 of which are appropriately welded to the post just above ground level. The cycle retention means includes a pair of upper rearwardly extending support portions 16 and 16' the extreme ends 17 of which are appropriately welded to the post adjacent the lower edge of the locker structure. This construction is illustrated in FIGS. 2 and 3. It is preferable that the mounting portions 14—14' and 16—16' be spaced farther apart where they join the vertical bars 9 and 9', and converge toward the post. This configuration will accomodate cycles having wheels of different diameters and different size tires, such as motorcycle tires as compared with bicycle tires.

Again referring to FIGS. 1, 2 and 3, it will be seen that the locker structure is securely mounted to the post by transversely extending, parallel and vertically spaced angle bars 17 and 18 each of which is appropriately welded to the associated post. The locker may be welded between the two angle bars in the position illustrated, or it may be detachably secured thereto by appropriate bolts or cap screws 19 and shown in FIG. 3. If this method of attachment of the locker to the post is utilized, it is advisable to modify the head of the cap screws 19 so that they may not easily be removed without special tools. Alternatively, the heads of the cap screws may be welded to the angle bars so that the threaded shank of the cap screw extends through appropriate apertures in the back wall of the locker where nuts may be applied to detachably secure the lock structure to the angle bars.

It may be advantageous to incorporate advertising material in conjunction with the locker construction. To accomodate such advertising, the assembly may be provided with an upwardly projecting panel 21 the lower edge of which is provided with a flange 22 caught between the forwardly extending flange of the angle bar 17 and the top of the locker. Any desired type of advertising material may be imprinted on the panel 21 or on appropriate labels applied to the panel. Obviously, where it is not desired to use the advertising panel, it may easily be removed merely by slipping it out from under the angle bar 17.

The locker is provided with an appropriate door 23 formed to close an opening 24 in the front wall 26 of the locker. The door is appropriately hinged as at 27 to the body of the locker, the hinge construction being of the type that will prevent tampering or removal of the door from the locker by vandals. Any conventional hinge arrangement for security type receptacles or safes may be used for this purpose. To be accessible to riders of bicycles and motorcycles, the locker will normally be mounted outside of a building, or near the entrance thereto. In either case, the locker is subject to inclement weather and should be made weather tight. To this end, as illustrated in FIG. 4, the opening in the front wall of the compartment is provided with an inwardly projecting flange 28 having a re-entrant flange 29 integral thereto to form a channel 31 within which the edge flange 32 of the door may engage. For maximum weather tightness of the opening, the channel may be provided with an appropriate gasket member 33 such as an O-ring against which the edge 34 of the door may impinge.

Figure 14:
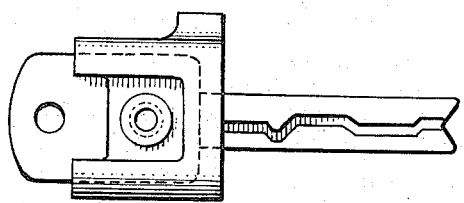
FIG. 14 is a side elevational view of the key used to lock the lock plate to the compartment wall.

To effect locking of the locker door and to simultaneously effect locking of a cycle to the locker structure or post 3, there is provided on the front wall of the locker a lock mechanism that is designated generally by the numeral 36 and which conveniently comprises a conventional lock structure purchased as a unit from a lock manufacturer. The lock mechanism 36 is illustrated best in FIGS. 5 through 8, and the operational aspects thereof, in conjunction with an appropriate coin, are illustrated schematically in FIGS. 9 through 12. Referring to FIG. 4, it will be seen that the front wall of the locker is provided with an aperture 38 within which the lock support plate 37 is adapted to fit. The front wall of the locker is provided on its inner surface adjacent the top and bottom edges of the aperture 38 with a pair of flanges 39 and 39', adapted to cooperate, respectively, with a lock latch 41 and a lock flange 42 formed on the lock plate 37. Thus, to insert and secure the lock plate 37 to the front wall of the locker, an appropriate key, illustrated in FIG. 14 is inserted into the key slot 43 formed in lock cylinder 44 on the end of which, behind the lock plate 37, there is mounted the lock plate latch 41. To insert the lock plate 37, the lower flange 42 is inserted into the space between the front wall 26 and the flange 39', and the lock plate tilted forward with the latch 41 in a retracted position. This permits the lock plate to nest flush within the aperture 38, where upon rotation of the key 45 into the attitude illustrated in FIG. 4a, the latch 41 is caused to engage between the back of the front wall 26 and the latch flange 39, thus locking the lock plate to the front wall of the locker.

As illustrated in FIGS. 5 and 6, the lock plate is provided with an upper coin slot 46 and a lower coin slot 47, the two coin slots being interconnected by a coin guide or chute 50 illustrated schematically in FIGS. 9–12. The lock plate is also provided with a second key slot 48 appropriately mounted in a rotatable bearing member 49 journaled on the lock plate 37, and having attached thereto for rotation therewith a lock disc 51 having a plurality of radially extending arms 52 and 53 for control of a coin inserted in the slot 46, and a third radially extending arm 60 having attached to its extreme end a spring 56 the opposite end of which is anchored to the lock plate. The tension spring 56 functions to impose a rotary bias on the barrel 49 of the key slot 48, tending to retain a slidable bolt 57 in retracted position as illustrated in FIG. 5. The bolt is slidably mounted on the lock plate 37, and is provided with a pin 58 adapted to work in a slot 59 formed in a radially extending lever arm 60 integral with or adapted to rotate with the lock plate 51.

Figure 13:
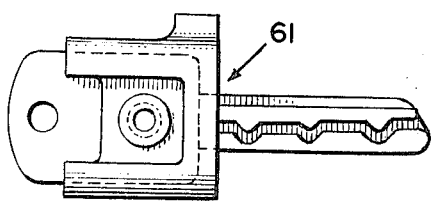
FIG. 13 is a side elevational view of the key used to lock the compartment door and lock the cycle to the compartment.

Thus, as illustrated in FIG. 4, rotation of the key slot and barrel 49 by appropriate manipulation of the key 61, illustrated in FIG. 13, causes the key slot to assume the position illustrated in FIG. 6, and the slidable bolt 57 to assume a position in which it lies projected past the inner peripheral edge of the opening 24 in the wall of the locker. In this position of the parts, as illustrated in FIG. 6, the key 61 may be removed from the key slot 48 and retained until such time as the customer wishes to unlock the locker and remove whatever valuables he has placed therein.

As illustrated in FIG. 4, the edge flange 32 of the door adapted to lie adjacent the lock plate 37 is provided with a lock slot 62 through which the bolt 57 is adapted to project when in extended position as illustrated in FIGS. 4 and 6. Projection of the bolt through the slot of course locks the door 23. Unlocking of the door to permit opening of the door requires that the key 61 be reinserted into the key slot 48 and the key slot with attached barrel 49 rotated in a counterclockwise direction into the attitude illustrated in FIG. 5.

It is an advantage in this type of locker that the door be locked simultaneous to locking of the cycle to the locker or post. Accordingly, the door 23 is provided with a vertically extending slot 63 proportioned to receive one link 64 of the chain 6, as illustrated in FIG. 8. The slot is proportioned to closely confine the link 64. On the inside surface of the door, in association with the slot 63, there is provided an auxiliary lock mechanism illustrated best in FIGS. 5 and 6. This mechanism is designated generally by the numeral 66 and is shown in FIG. 5 to comprise a block 67 secured to the inner surface of the door by appropriate angle brackets one flange 68 of each of which is secured as by screws 69 to the opposite edges of the block 67. The other flanges of the angle bars may be spot welded to the interior surface of the door in a conventional manner.

The block 67 is provided with a transversely extending slot 71 which lies coincident with the slot 63 in the door of the locker. The block 67 is also provided with an elongated bore 72, preferably centrally disposed in the block, and adapted to slidably receive therewithin a slide bolt 73. The slide bolt is provided with a cross pin 74 adjacent web 76 formed in the body of the block 67 by recess 77 formed in the block adjacent the lock plate 37, and an intermediate recess 78 formed in the block between the transversely extending slot 71 and recess 77. The intermediate recess 78 is utilized to confine a coil compression spring 79 one end of which abuts against the left end 81 of the recess as viewed in FIG. 5, while the other end of the coil compression spring abuts against the cross pin 74. It will thus be seen that any movement of the slide bolt 73 to the left as viewed in FIGS. 5 and 6 will impose tension on coil compression spring 79, which will resiliently resist such movement.

Referring to FIGS. 5 and 6, it will be seen that to effect locking of the chain 6 to the locker door, it is only necessary that one of the links 64, as illustrated in FIG. 8, be inserted through the coincident slots 63 and 71, and held therein during the instant that the key 61, normally found seated in key slot 48, is rotated clockwise to cause the bolt 57 to move to the left as viewed in FIGS. 5 and 6. As bolt 57 moves to the left, the end 82 of bolt 57 engages the associated end 83 of bolt 73 causing bolt 73 to move to the left in the bearing block 67. Such movement of the slide bolt 73 causes the left end portion 84 of the bolt to be inserted through the link 64 so as to securely retain the link locked to the block 67. When the key 61 has been turned into the attitude illustrated in FIG. 6, the key is removed from the slot 48 and the barrel 49 remains locked in this attitude until such time as the key is reinserted. Retention of the barrel 50 in this position effects retention of slide bolt 57 in the attitude illustrated in FIG. 6, thus forcibly retaining the slide bolt 73 in interengaging relationship with the link 64. It will thus be seen that both the door of the locker and the cycle attached to the locker or to the post 3 may simultaneously be locked by a single activation of the lock mechanism mounted on lock plate 37.

Figure 9:
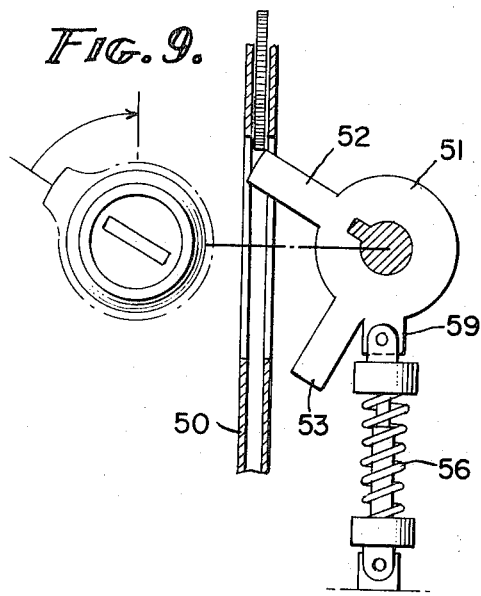
FIGS. 9 through 12 are schematic views of the lock mechanism, shown in various aspects of its operation, in conjunction with a coin slot and coin.
Figure 10:
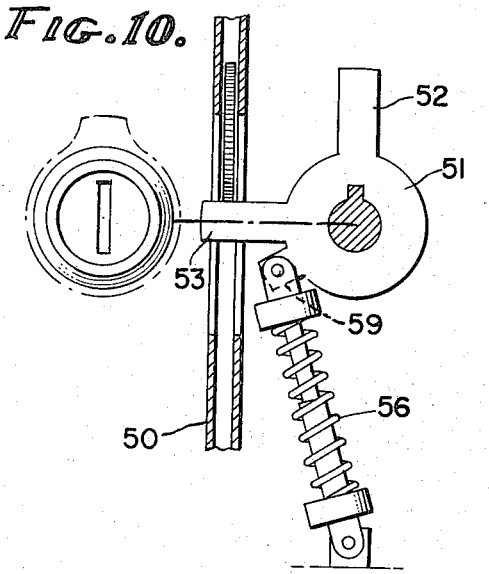
Figure 11:
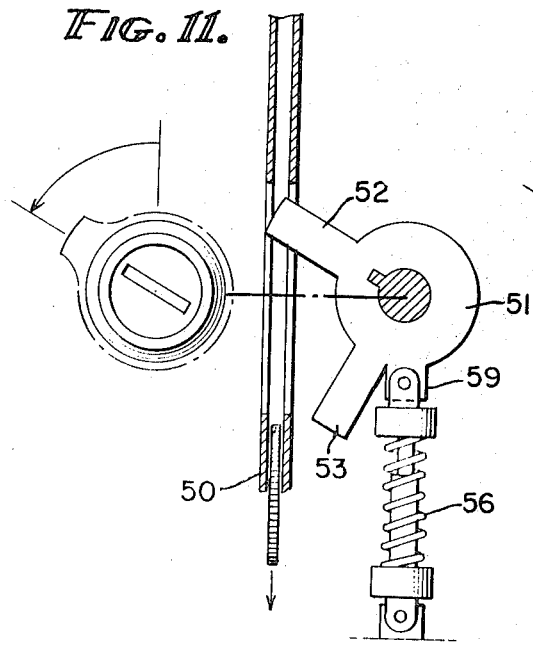
Figure 12:
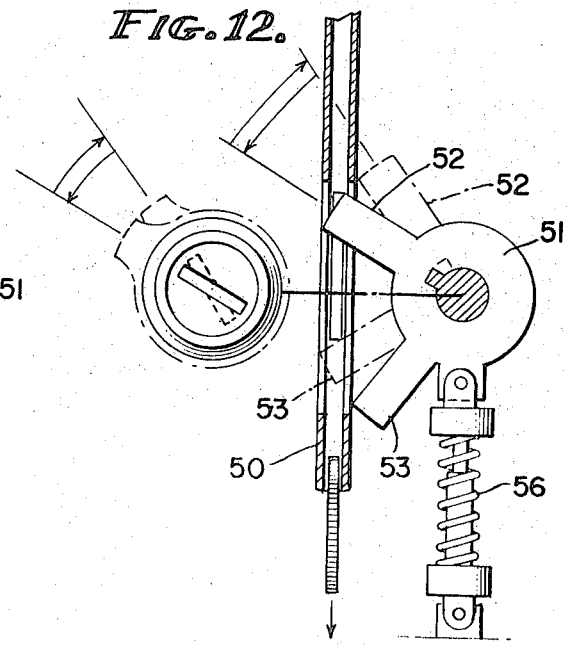

It is an inducement for persons that ride bicycles or motorcycles to use the lockers and cycle securing means, for the use to be without cost. Accordingly, the mechanism illustrated in FIGS. 4, 5 and 6, is adapted to cooperate with insertion of a coin, say a quarter, in slot 46 to enable the user to rotate key 61 and barrel 49, while knowing that his coin will be returned to him. As illustrated in FIG. 9 insertion of the quarter in slot 46 causes the quarter to drop through the chute 50 into a first position in which it releases barrel 49 for rotation by twisting key 61. The quarter is retained in this position as barrel 49 is rotated into the position illustrated in FIG. 6. When the key has been turned to this position, the quarter drops through the chute to a second position in which it is retained until such time as the key is reinserted and the lock barrel 49 is rotated counterclockwise to unlock the locker. When this is done, the supporting means for the quarter in the chute is removed or retracted, and the quarter is permitted to drop out of the slot, thus effecting a refund to the user of the locker and cycle locking means. It will of course be obvious that upon rotation of the lock barrel counterclockwise, the slide bolt 57 slidably journaled on lock plate 37 is caused to move to the right, thus releasing slide bolt 73 which also moves to the right under the impetus of coil compression spring 79. As the lock bolt 73 moves to the right, the link 64 of the chain is disengaged, thus permitting the cycle to be removed from the stand.

Having thus described the invention, what is claimed to be novel and sought to be protected by letters patent is as follows:

1. A storage locker incorporating cycle locking means comprising:
   a. a hollow storage receptacle having a door therein to permit access to the interior of the receptacle when open and providing security when locked for articles placed therein;
   b. support means for the hollow storage receptacle;
   c. a lock mechanism fixed to the storage receptacle and including a key operated slide bolt selectively movable to lock the door of the receptacle in closed condition; and
   d. an elongated chain or the like permanently anchored at one end to said support means for the storage receptacle, another selected portion of the chain being selectively lockable to the receptacle by actuation of said door lock mechanism to lock the storage receptacle whereby an intermediate length of said chain may be interlaced through structural parts of an associated cycle to securely lock the cycle to the receptacle;
   e. said key operated slide bolt including a first portion slidably mounted on the receptacle and operative to lock the door thereto, and a second portion slidably mounted on the door and operative to lock the chain to the receptacle door.

2. The combination according to claim 1, in which cycle support means are mounted on said receptacle support means in association with said receptacle whereby a cycle supported in said cycle support means is in close proximity to said receptacle so that said elongated chain or the like may be interlaced through structural portions of the cycle and selectively locked to said receptacle.

3. The combination according to claim 1, in which said receptacle is provided with an opening therein closed by said door, and means are provided on said door and receptacle for rendering said receptacle weathertight when the door is closed.

4. The combination according to claim 1, in which said lock mechanism includes a key and coin slot through which a coin may be inserted to permit rotation of the key, and said lock mechanism is conditioned for operation by insertion of a coin in said coin slot, whereby rotation of the key in said lock mechanism simultaneously locks the door of said receptacle and locks said elongated chain or the like to the door of said receptacle.

5. The combination according to claim 1, in which said lock mechanism releases said key when said door is locked, and releases said coin when the key is reinserted and the key turned to unlock the receptacle door.

* * * * *